United States Patent
Pinto

(10) Patent No.: US 8,360,511 B2
(45) Date of Patent: Jan. 29, 2013

(54) BODY AND CONTAINER FOR TRANSPORT OF CONSTRUCTION SAND AND GRAVEL MINING, AND FABRICATING METHOD

(76) Inventor: Rodrigo Andres Vergara Pinto, Melipilla (CL)

( * ) Notice: Subject to any disclaimer, the term of this patent is extended or adjusted under 35 U.S.C. 154(b) by 14 days.

(21) Appl. No.: 12/901,719

(22) Filed: Oct. 11, 2010

(65) Prior Publication Data

US 2012/0086235 A1 Apr. 12, 2012

(51) Int. Cl.
*B62D 33/02* (2006.01)

(52) U.S. Cl. ............... 296/183.1; 298/17 R; 296/183.2

(58) Field of Classification Search ............... 296/39.1, 296/39.2, 181.1, 181.2, 181.3; 105/247; 298/24, 22 P, 1 A, 1 B, 18, 17.5, 17.6, 17 R, 298/7; 414/495
See application file for complete search history.

(56) References Cited

U.S. PATENT DOCUMENTS

| | | | | |
|---|---|---|---|---|
| 2,753,018 | A * | 7/1956 | Curell | 52/261 |
| 3,088,420 | A * | 5/1963 | Faverty et al. | 105/422 |
| 3,132,604 | A * | 5/1964 | Tappan et al. | 105/422 |
| 3,266,837 | A * | 8/1966 | Stricker, Jr. et al. | 296/186.5 |
| 3,363,933 | A * | 1/1968 | Wilson | 296/183.2 |
| 3,412,883 | A * | 11/1968 | Birdsall | 414/470 |
| 3,578,375 | A * | 5/1971 | Finefrock | 296/39.2 |
| 3,652,123 | A * | 3/1972 | Speers | 296/183.1 |
| 4,076,298 | A * | 2/1978 | Hanzelka et al. | 296/191 |
| 5,851,043 | A * | 12/1998 | Moutrey et al. | 296/39.2 |
| 6,000,741 | A * | 12/1999 | Reynolds et al. | 296/39.2 |
| 6,022,068 | A * | 2/2000 | D'Amico | 296/183.2 |
| 6,129,409 | A * | 10/2000 | D'Amico | 296/183.2 |
| 6,174,014 | B1 * | 1/2001 | Hook et al. | 296/39.2 |
| 6,305,731 | B1 * | 10/2001 | Hook et al. | 296/39.2 |
| 6,637,808 | B1 * | 10/2003 | Ling et al. | 296/183.2 |
| 6,799,402 | B2 * | 10/2004 | Faxe et al. | 52/390 |
| 6,854,808 | B2 * | 2/2005 | Kostecki | 298/7 |
| 7,025,407 | B2 * | 4/2006 | Medel | 296/183.2 |
| 7,195,309 | B1 * | 3/2007 | Subramanian et al. | 296/198 |
| 7,207,621 | B2 * | 4/2007 | D'Amico et al. | 296/183.1 |
| 2009/0015028 | A1 * | 1/2009 | Zamorano Jones | 296/39.2 |

FOREIGN PATENT DOCUMENTS

FR 2695086 A1 * 3/1994

OTHER PUBLICATIONS

Machine translation attached to reference -N.*

* cited by examiner

*Primary Examiner* — Glenn Dayoan
*Assistant Examiner* — Pinel Romain
(74) *Attorney, Agent, or Firm* — Hamre, Schumann, Mueller & Larson, P.C.

(57) ABSTRACT

A folded hopper for a mining truck, having a floor made of an anti-abrasive material that increases its resistance and simplifies manufacturing work, bringing up substantial savings of welding and being of low weight, and improving load distribution. The floor includes floor folds with anti-abrasive, side folding that eliminates welding at joints and floor, which improves mechanical resistance and eliminates stress arising from heat concentration upon welding. At the sides, the reinforcement on several beams is simplified by two larger joining beams that keep the structure rigid.

19 Claims, 2 Drawing Sheets

BODY AND CONTAINER FOR TRANSPORT OF CONSTRUCTION SAND AND GRAVEL MINING, AND FABRICATING METHOD

FIELD

The present inventions relates to the construction of hoppers or mining trucks, aggregate trucks in general, and for train freight cars.

BACKGROUND

Within the prior art are Hoppers for mining trucks, aggregate trucks in general, and train freight cars of different designs and shapes that are used to transport materials or mineral ore of differing granulometries, particle sizes and densities, which causes the volume or tonnage to differ depending of the latter parameter as regards an identical volume. The material hoppers are generally made of is structural steel and, in some cases, anti-abrasive steels, depending on the application and loading system. This latter point differs from each site, giving a better or worse condition with respect to the loading of the material, as loading through a chute, which is a rather gradual and controlled loading to a rather impact loading as would be the case of a front loader that projects the load by the sides of the truck, falling on the loading area or on the opposite side of the hopper, the operator's loosing sight of the equipment, and the welds that are used to join sides and floor or front and floor getting seriously damaged.

It turns out to be necessary, for all of the aforementioned conditions, to have stronger hoppers given current conditions and trends in the mining industry, which prefers larger equipment and greater loading capacity, with more equipment maintenance availability. To this effect, larger and stronger hoppers are required, reason by which they need a larger number of structures making them stronger and/or thicker in order to absorb impacts, in addition to increasing availability as a result of the wearing of the plates that are in contact with the material and aggregate's sliding upon emptying.

Current requirements of these load or hopper components force them to be sturdier, increasing its own weight along with a decrease in the material transported, depleting from the equipment (trucks or freight cars) loading capacity or, on the other hand, if a lighter hopper is made, sacrificing the thickness and materials of its structure, the frequency of its maintenance or replacements will have to be increased to cope with the decreased equipment availability due to frequent maintenance, neither of these scenarios is that users seek but the equilibrium of a hopper being able to resist loads and impacts and abrasion, and, in turn, light for its availability for corrective maintenance to be greater.

This utility model or invention is based on the use of state of the art or cutting edge technological elements in order to fulfill the objectives required by current market, achieving resistance to greater loading capacity without increasing its weight from structuring the unit or lengthen its useful life due to floor abrasion to meet availability as required by the customer.

In order to fulfill the resistance and availability requirements there presently exist special steels having greater structural resistance, from 300 MPa to 700 MPa resistance, depending on the type and origin. Our proposal is that of using steels having better mechanical properties, a structure being able to have equal or greater resistance without having to increase the thickness of the materials, since their densities do not vary much, in addition to making a design with computer design methods and tools currently available in order to simplify the structure, said structure being virtually analyzed fast and safely, which allows the making of steel folds at critical areas of the hopper which makes it more resistant. At the same time, in order for these folds to be made, more powerful and high-precision equipment is required, which forces us to use large folding-capacity technology having CNC's (Computer Numerical Controls) given the size of the precision pieces and the steels also require more power to fold due to their special properties.

On the other hand, in order to prevent abrasion wear, abrasion-resistant steels having hardness indices spanning from 200 current Brinell to 450 and/or 500, or over, being able to considerably increase the useful life against abrasion, but the resistance of which rises from about 800 Mpa to 1,400 Mpa, and over, are provided, which requires, moreover, the use of more robust equipment than traditionally, as was stated above. This allows to provide a highly resistant, highly available product for production, but having a low structural weight, thus allowing to transport larger loads and reduce the cost of fuel consumption, which, in large pieces of equipment, is a factor of considerable relevance.

Traditional manufacture of hoppers is based on very heavy structures having standards beams or folds. In some cases, special materials are used depending on the design, but they do not comply with the abovementioned objectives. As regards light hoppers, their weight is smaller in order not to reduce the truck's capacity, but have a shorter useful life due to shocks and/or abrasion, which forces the equipment to remain idle for more frequent maintenance.

As for applications of anti-abrasive steels, they are applied in their natural state as unfolded plates as a result of their high-resistance properties, and because making them with standard methods is very difficult.

SUMMARY

The development of the present innovation is entitled "A folded hopper for a mining truck" as was described in the "Description of the Invention" section. This invention is carried out by through a methodology and know how of each one of the steps comprising it, which make it special in that it is an invention, since the prior art does not contain the technique and supplementation of all of the elements that turn it unique. Special handling is applied when applying the materials, especially cutting-edge steels, since the challenges that are faced to fold the design, since the sizes of the components, the folds that are especially located at particular and strategic places, which, without the assistance of computer simulation tools could not be achieved, so that the necessary and precise support the hopper required may be provided. This is achieved by supplementing and adapting software related to 3D studies, together with finite element analysis upon developing each part, and later the general analysis of the assembly, simulating different typical working conditions on upward and downward slope, side inclinations, etc.

Worth mentioning as a exclusive property among the components is that of the floor folds with anti-abrasive, side folding that eliminates welding at joints and floor, which improves mechanical resistance and eliminates stress arising from heat concentration upon welding.

At the sides, the reinforcement on several beams simplified by two larger joining beams that keep the structure rigid.

At the front of the hopper, where the impact of the load and of the loading cone hits the cabin, this plate is folded and its form and size reinforces its structure by replacing outer reinforcement beams, decreasing the weight of the hopper and holding a greater additional load of material. The direction of the folding or of the folds may be transverse or longitudinal, or both, and it will depend on the design or load conditions.

Hopper shield. This element, in general, is not analyzed in detail, only as regards safety considerations related to the protection the truck cabin against excesses or spills hood of load from the cone. In this case, in addition, the protective element was folded in order to have the necessary resistance. In this case the fold is transverse, but it may take a longitudinal folding condition, or both, thus eliminating several reinforcement beams and especially being limited to the load cone with a retaining effect so that the material does not pass that point towards the truck's front area, thus changing the load's center of gravity, varying the distribution of the load between truck axles, thus affecting tire wear, among other effects on the truck's structure.

In addition, using fewer beams and simplifying the design by the folded large-piece system makes its compact structure contain stress concentration points, helping its performance as a structural assembly subjected to cyclical stress, minimizing the likelihood of specific failures.

The supplement of each one of the studies on each hopper, both in the system to and in the database, allows us to adapt the design to the needs of each customer as for manufacture and design, being able to make improvements in accordance with operational conditions at each site, that is, the density of the material is low, with respect to the one considered in the initial study, the hopper's volume may be increased and/or the thickness of the materials may be reduced, that is, lower the safety factors where indicated and allowed by the analysis without affecting a quality and reliable product. The direction and number of the folds in each part of the hopper or of the freight car is determined according to the structure, load parameters and study of the components' finite elements.

DETAILED DESCRIPTION

A preferred embodiment of the present invention is the simplified number of pieces comprising the heavy (from 100 to 400 ton) mining truck hopper, because its design having strategic simplifications in its manufacture, the reduced number of components, the application of special steels, providing a hopper having greater resistance to impacts as a result of its innovating design containing strategic folds, greater abrasion resistance from the use of special steels, and lighter from eliminating structural beams, make it an ideal hopper for the objectives proposed, achieving a perfect balance between the resistance and reduced weight of the hopper. This gives way to lower costs as a result of its longer useful life, innovative shield, which allows the loading cone not to move towards the cabin, keeping load center, decreasing tire wear and, more importantly, increasing the truck operator's safety.

Another preferred embodiment relates to small tonnage train and truck cars, because the design is fully adaptable to any size and shape as desired, since the designs are computer analyzed, proving the effectiveness of each one of the preferred embodiments.

Figure 1:
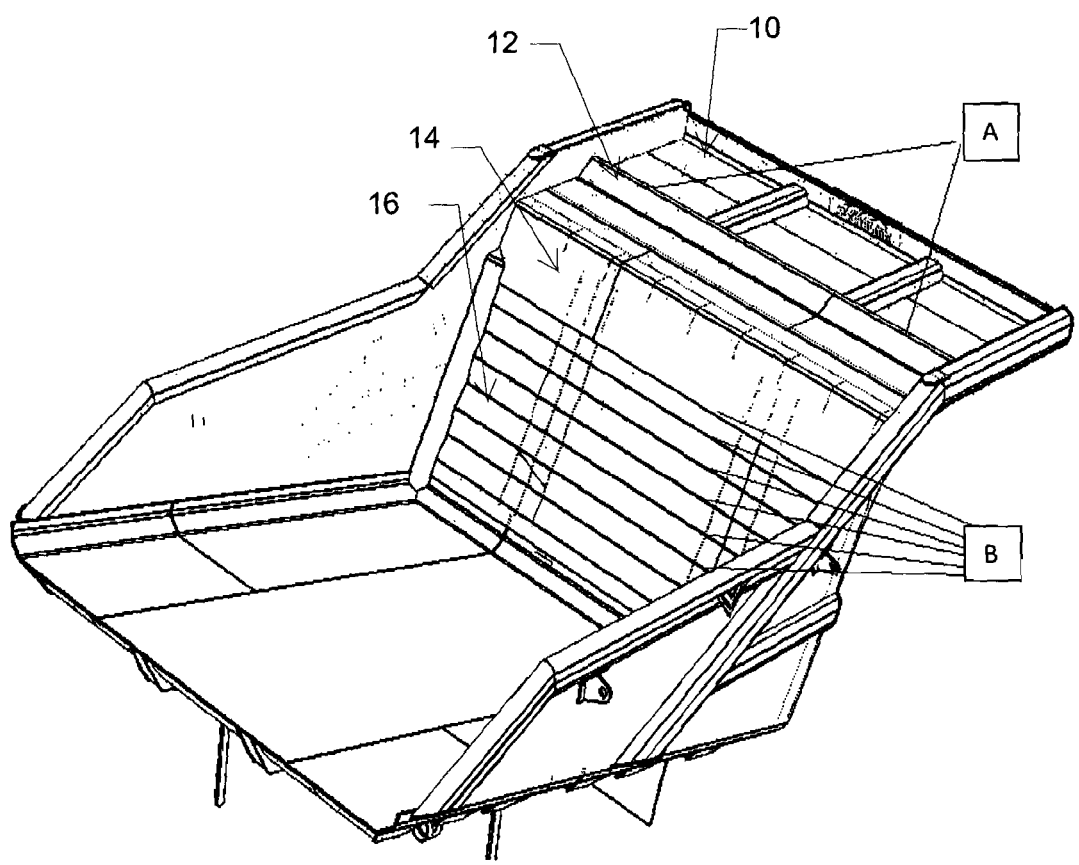
FIG. 1 shows the shield fold for resistance thereto and retention of the material towards the equipment's front area.

As is shown in FIG. 1, in a zone A, a shield wall 10 having a shield fold 12 for resisting and retaining the material moving towards the equipment's front zone is identified. As illustrated in FIG. 1, the shield fold 12 extends from one side of the shield wall to the opposite side of the shield wall transverse to the sidewalls, and the shield fold 12 is located forward of the front wall and rearward of a front end of the shield wall.

Figure 2:
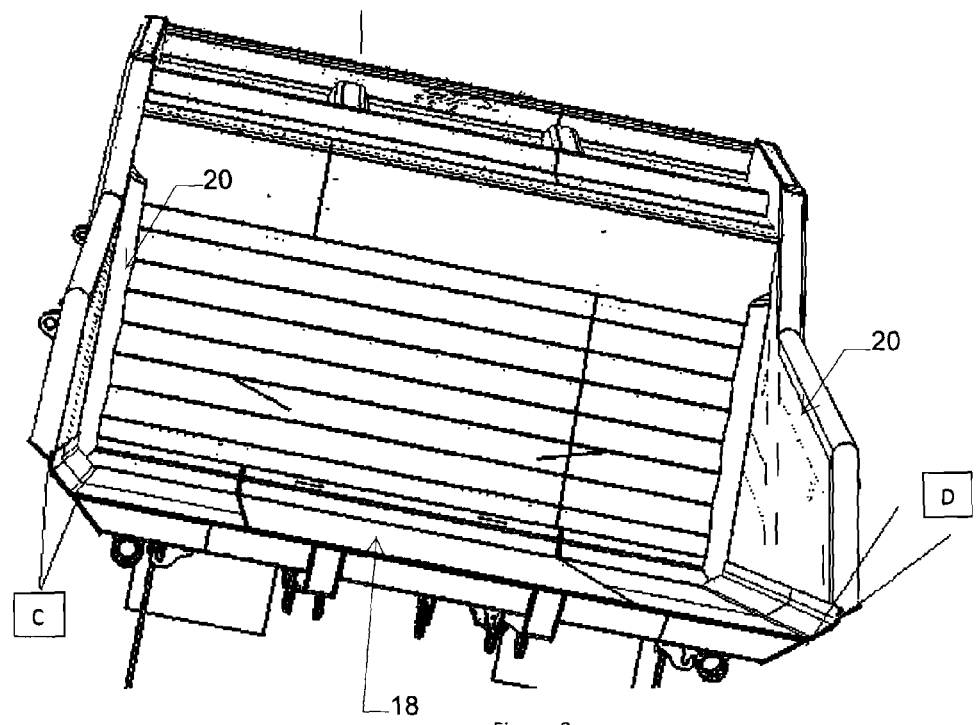
FIG. 2 show the joining folds between the equipment's floor and side.
Figure 3:
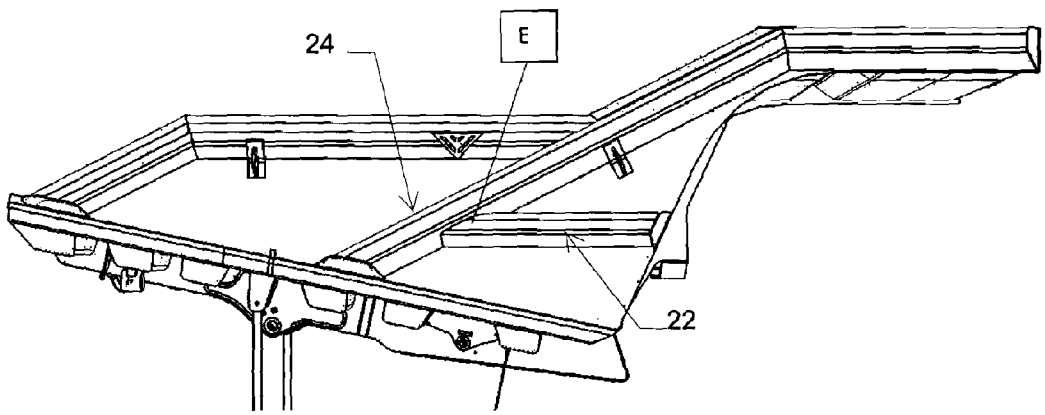
FIG. 3 shows the joining of two folded beams, in form and size, which, in their layout, replace several beams having the same purpose.

Zone B, folded front wall 14; improves body resistance and eliminates structural pieces, prevents this zone from buckling due to its folded form, namely a plurality of folds 16. The direction of the folding may be transverse (as in the figure) or longitudinal, and/or both options, as required by the case or study to be applied. Zones C and D, in FIG. 2, show joining folds between the equipment's floor 18 and sidewalls 20. As for the fold, it may be folded along with the load flow if required by the study. In FIG. 3, point E shows the joining of two folded beams 22, 24 in shape and size that, in their layout, replace several beams fulfilling the same purpose, structuring the assembly's side portion. The side plates may be folded vertically or in the direction of the flow, as required.

What is claimed:

1. A mining truck hopper, comprising:
a floor having a front and a rear;
first and second sidewalls extending upwardly from the floor, the first and second sidewalls having outside surfaces;
a front wall extending upwardly from the front of the floor and extending between the first and second sidewalls;
a shield wall extending forwardly from the front wall in a direction away from the rear of the floor;
the floor and the first and second sidewalls are joined by folds and there are no welds between the floor and the first and second sidewalls;
the shield wall includes a shield fold that extends transversely to the first and second sidewalls, and the shield fold is located forward of the front wall and rearward of a front end of the shield wall;
the front wall includes a plurality of folds that extend transversely to the first and second sidewalls and parallel to the shield fold;
the floor, the first and second sidewalls, the front wall, and the shield wall are made of steel; and
the first and second sidewalls are supported by two folded beams on the outside surfaces of the first and second sidewalls.

2. The mining truck hopper of claim 1, wherein the steel has a hardness of at least 200 Brinell.

3. The mining truck hopper of claim 2, wherein the steel has a hardness of at least 500 Brinell.

4. The mining truck hopper of claim 2, wherein the steel has a hardness between 200-500 Brinell.

5. The mining truck hopper of claim 1, wherein the steel has a resistance of at least 300 MPa.

6. The mining truck hopper of claim 5, wherein the steel has a resistance of at least 700 MPa.

7. The mining truck hopper of claim 5, wherein the steel has a resistance of between 300-700 MPa.

8. The mining truck hopper of claim 1, wherein the steel is A514 steel.

9. The mining truck hopper of claim 1, wherein the steel has a thickness of at least 6 mm.

10. The mining truck hopper of claim 9, wherein the steel has a thickness of at least 25 mm.

11. The mining truck hopper of claim 9, wherein the steel has a thickness of between 6-25 mm.

12. The mining truck hopper of claim 1, wherein the folds in the front wall extend from adjacent to the floor, and extend from the first sidewall to the second sidewall.

13. The mining truck hopper of claim 1, wherein the shield fold extends from one side of the shield wall to an opposite side of the shield wall.

14. The mining truck hopper of claim 1, wherein the floor is sloped downwardly with the rear of the floor disposed higher than the front; the front wall is sloped in a forward direction with an upper portion of the front wall spaced further from the rear of the floor than a lower portion of the front wall.

15. A hopper structure configured to transport mining material, comprising:
- a floor having a front and rear;
- first and second sidewalls extending upwardly from the floor, the first and second sidewalls having outside surfaces;
- a front wall extending upwardly from the front of the floor and extending between the first and second sidewalls;
- a shield wall extending forwardly from the front wall in a direction away from the rear of the floor;
- the floor and the first and second sidewalls are joined by folds and there are no welds between the floor and the first and second sidewalls;
- the shield wall includes a shield fold that extends transversely to the first and second sidewalls, and the shield fold is located forward of the front wall and rearward of a front end of the shield wall;
- the front wall includes a plurality of folds that extend transversely to the first and second sidewalls and parallel to the shield fold;
- the floor, the first and second sidewalls, the front wall, and the shield wall are made of steel having a hardness of at least 200 Brinell, a resistance of at least 300 MPa, and a thickness of at least 6 mm; and
- the first and second sidewalls are supported by two folded beams on the outside surfaces of the first and second sidewalls.

16. The hopper structure of claim 15, wherein the steel is A514 steel.

17. The hopper structure of claim 15, wherein the folds in the front wall extend from adjacent to the floor, and extend from the first sidewall to the second sidewall.

18. The hopper structure of claim 15, wherein the shield fold extends from one side of the shield wall to an opposite side of the shield wall.

19. The hopper structure of claim 15, wherein the floor is sloped downwardly with the rear of the floor disposed higher than the front; the front wall is sloped in a forward direction with an upper portion of the front wall spaced further from the rear of the floor than a lower portion of the front wall.

* * * * *